No. 760,467. PATENTED MAY 24, 1904.
C. MICHAUD.
DUST PAN.
APPLICATION FILED SEPT. 12, 1903.
NO MODEL.

Witnesses
Geo. Ackman Jr.
Herbert D. Lawson.

Inventor
Conrad Michaud,
By Victor J. Evans.
Attorney

No. 760,467.

Patented May 24, 1904.

UNITED STATES PATENT OFFICE.

CONRAD MICHAUD, OF NEW YORK, N. Y.

DUST-PAN.

SPECIFICATION forming part of Letters Patent No. 760,467, dated May 24, 1904.

Application filed September 12, 1903. Serial No. 173,010. (No model.)

*To all whom it may concern:*

Be it known that I, CONRAD MICHAUD, a citizen of the United States, residing at New York, in the county of New York and State of New York, have invented new and useful Improvements in Dust-Pans, of which the following is a specification.

My invention relates to new and useful improvements in dust-pans; and its object is to provide a device of this character having a cover which is normally closed to prevent the contents of the dust-pan from becoming accidentally displaced.

A further object is to provide mechanism whereby the cover may be quickly raised so as to permit dust, &c., to be readily brushed upon the dust-pan.

With the above and other objects in view the invention consists in providing a dust-pan having a hinged cover which is held normally closed by means of a spring. To this cover is secured an arm, to which is fastened a flexible strip which extends over an arrangement of pulleys and into the handle of the pan, where it is provided with a hook, by means of which it may be readily grasped and operated.

The invention also consists in the novel construction and arrangement of parts hereinafter more fully described and claimed, and illustrated in the accompanying drawings, in which—

Figure 1:
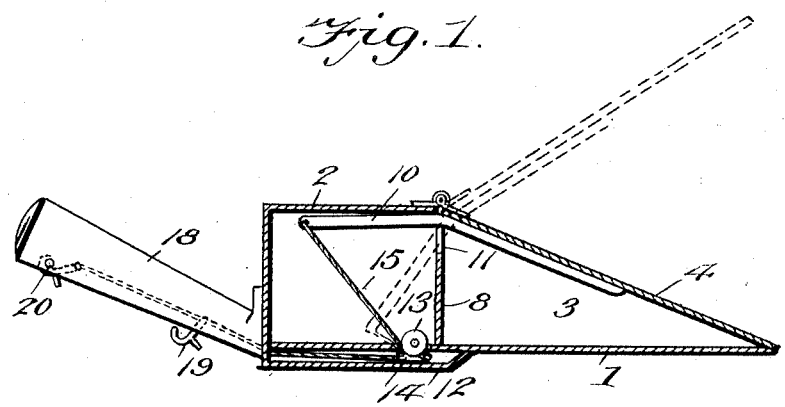
Figure 2:
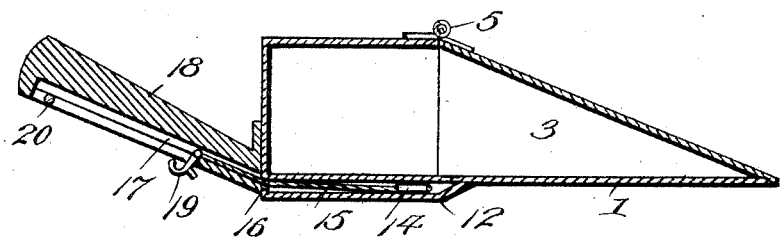
Figure 3:
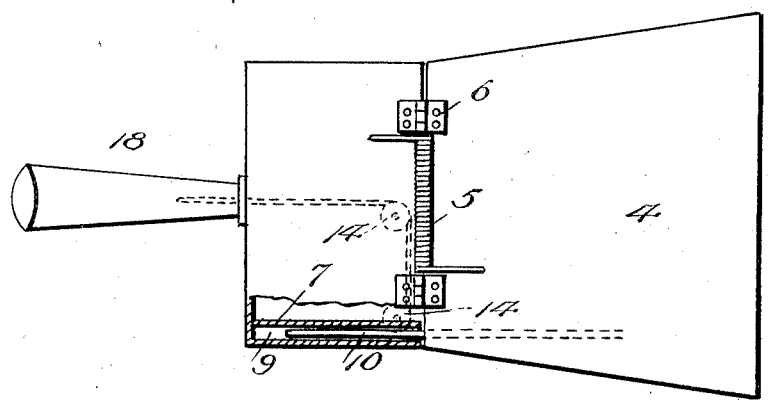

Figure 1 is a vertical longitudinal section through one side of the dust-pan and showing the cover-operating mechanism, the movable parts being shown in dotted lines with the cover raised. Fig. 2 is a central vertical longitudinal section through the dust-pan; and Fig. 3 is a plan view, one side of the pan being broken away to show the casing of the operating mechanism.

Referring to the figures by numerals of reference, 1 is the bottom of the dust-pan, having a preferably rectangular casing 2 upon the rear end thereof, and from this casing extends angular side walls 3. A cover 4 is hinged to the forward edge of the top of the casing 2 and has a coiled spring 5 connected to the hinges 6 thereof for holding said cover normally in position on the side walls 3 and in contact with the forward edge of the bottom 1. Arranged within the casing 2, at one side thereof, is a vertical partition 7, which is arranged parallel with one of the sides of the casing, and a short transversely-extending partition 8 is interposed between the side of the casing and the partition 7, and these two partitions, together with the side and end walls of the casing 2, form a compartment 9, into which projects an arm 10, which is secured to the lower face of the cover 4 and projects through an aperture 11, formed in the partition 8. A receptacle 12 is formed upon the lower surface of the bottom 1 at a point under the casing 2 and extends transversely of said casing. This receptacle is closed at the sides and ends, and a pulley 13 is journaled in the bottom 1 and projects into the receptacle 12 and the compartment 9. Horizontally-arranged pulleys 14 are also journaled within the receptacle 12, adjacent pulleys 13 and the longitudinal center of the dust-pan, respectively, and mounted on the three pulleys 13 and 14 is a flexible strip 15, which is connected at one end to the arm 10 and extends outward through an aperture 16 in the rear end of the receptacle 12 into a groove 17, formed in the handle 18 of the device. A hook 19 is secured to the outer end of the flexible strip 15 and serves as a stop to prevent the end of said strip from passing into the receptacle 12. This hook is also drawn longitudinally within the groove 17 and placed in engagement with a pin 20, arranged within said groove. During this operation the arm 10 will, as is obvious, be swung downward and raise the cover 4, as shown in dotted lines in Fig. 1, and said cover will be held in this position as long as the hook 19 engages the pin 20. The spring 5 will be tensioned by the raising of the cover 4, and when the hook 19 is released from the pin 20 this spring will promptly return the parts to their normal positions.

It will be seen that the device is extremely simple in construction, and the cover can be readily raised by one of the fingers of the hand grasping the handle 18.

The pan is light and can be manufactured at slight cost.

In the foregoing description I have shown the preferred form of my invention; but I do not limit myself thereto, as I am aware that modifications may be made therein without departing from the spirit or sacrificing the advantages thereof, and I therefore reserve the right to make such changes and alterations as may fairly fall within the scope of my invention.

Having thus described my invention, what I claim as new, and desire to secure by Letters Patent, is—

1. In a dust-pan the combination with a bottom having a receptacle at one end thereof and a spring-pressed cover hinged to the receptacle; of partitions within the receptacle forming a compartment, an arm connected to the cover and projecting into the compartment, pulleys arranged within a receptacle formed in the bottom of the casing, a handle, a flexible strip connected to the arm and mounted on the pulleys, and means upon the strip for securing it to the handle.

2. In a dust-pan, the combination with a bottom having a casing thereon, the bottom of said casing forming a receptacle; of a spring-pressed cover hinged to the casing, partitions within the casing forming a compartment, an arm extending from the cover into the compartment, pulleys journaled within the receptacle, a grooved handle, a flexible strip secured to the arm and mounted upon the pulleys, said strip extending into the groove in the handle, and means upon the strip for securing it to the handle.

In testimony whereof I affix my signature in presence of two witnesses.

CONRAD MICHAUD.

Witnesses:
   C. VON ODEN HUGHES,
   HUGH MCKENNA.